United States Patent
Gilad et al.

(10) Patent No.: US 9,954,759 B2
(45) Date of Patent: Apr. 24, 2018

(54) DETECTING PROXY-BASED COMMUNICATIONS

(71) Applicant: INTERNATIONAL BUSINESS MACHINES CORPORATION, Armonk, NY (US)

(72) Inventors: Yossi Gilad, Tel-Mond (IL); Shahar Kohanim, Tel-Aviv (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 327 days.

(21) Appl. No.: 14/811,855

(22) Filed: Jul. 29, 2015

(65) Prior Publication Data

US 2017/0034037 A1    Feb. 2, 2017

(51) Int. Cl.
*G06F 15/173* (2006.01)
*H04L 12/26* (2006.01)
*H04L 29/08* (2006.01)

(52) U.S. Cl.
CPC ............ *H04L 43/50* (2013.01); *H04L 43/06* (2013.01); *H04L 43/0864* (2013.01); *H04L 67/28* (2013.01)

(58) Field of Classification Search
CPC ..... H04L 43/50; H04L 67/28; H04L 43/0864; H04L 43/06
See application file for complete search history.

(56) References Cited

U.S. PATENT DOCUMENTS

| 6,031,818 A | 2/2000 | Lo et al. |
| 6,115,357 A | 9/2000 | Packer et al. |
| 6,445,681 B1 | 9/2002 | Pogrebinsky |
| 6,601,098 B1 | 7/2003 | Case |
| 8,027,267 B2 | 9/2011 | Denby |
| 2002/0120727 A1 | 8/2002 | Curley |
| 2009/0320131 A1 | 12/2009 | Huang |

(Continued)

OTHER PUBLICATIONS

List of IBM Patents or Applications Treated as Related, Nov. 25, 2015.

(Continued)

*Primary Examiner* — John B Walsh
(74) *Attorney, Agent, or Firm* — Daniel J. Swirsky; AlphaPatent Associates Ltd.

(57) ABSTRACT

Evaluating communications via a computer network for the presence of proxy-based communications, by sending to a computer via a computer network multiple data packets followed by an out-of-sequence data packet that is out-of-sequence relative to any of the multiple data packets, receipt of the out-of-sequence data packet configured to cause the computer to send an acknowledgement via the computer network, and to cause the requestor to send a second data request via the computer and the computer network, detecting receipt of the acknowledgement at a first time, detecting receipt of the second data request at a second time, calculating a time delay between the first time and the second time, performing the sending, detecting and calculating steps multiple times for calculating multiple time delays, and determining whether the requestor is communicating via a proxy by evaluating the multiple time delays with respect to a predefined proxy evaluation criterion.

10 Claims, 3 Drawing Sheets

(56) References Cited

U.S. PATENT DOCUMENTS

2014/0304395 A1    10/2014  Chandrayana et al.
2014/0379902 A1*   12/2014  Wan ..................... H04L 41/142
                                                        709/224
2015/0195381 A1*    7/2015  Huang ................... H04L 69/16
                                                        370/241

OTHER PUBLICATIONS

B. Briscoe, J. Manner, "Byte and Packet Congestion Notification (RFC7141)", IPCOM/000235433, Feb. 1, 2014, Internet Society Requests for Comment, USA.
A. Morton, B. Claise, "Packet Delay Variation Applicability Statement (RFC5481)", IPCOM/000180090, Mar. 1, 2009, Internet Society Requests for Comment, USA.
M. Allman, V. Paxson, E. Blanton, "TCP Congestion Control (RFC5681)", Sep. 1, 2009, IETF, USA.
List of IBM Patents or Applications Treated as Related.

* cited by examiner

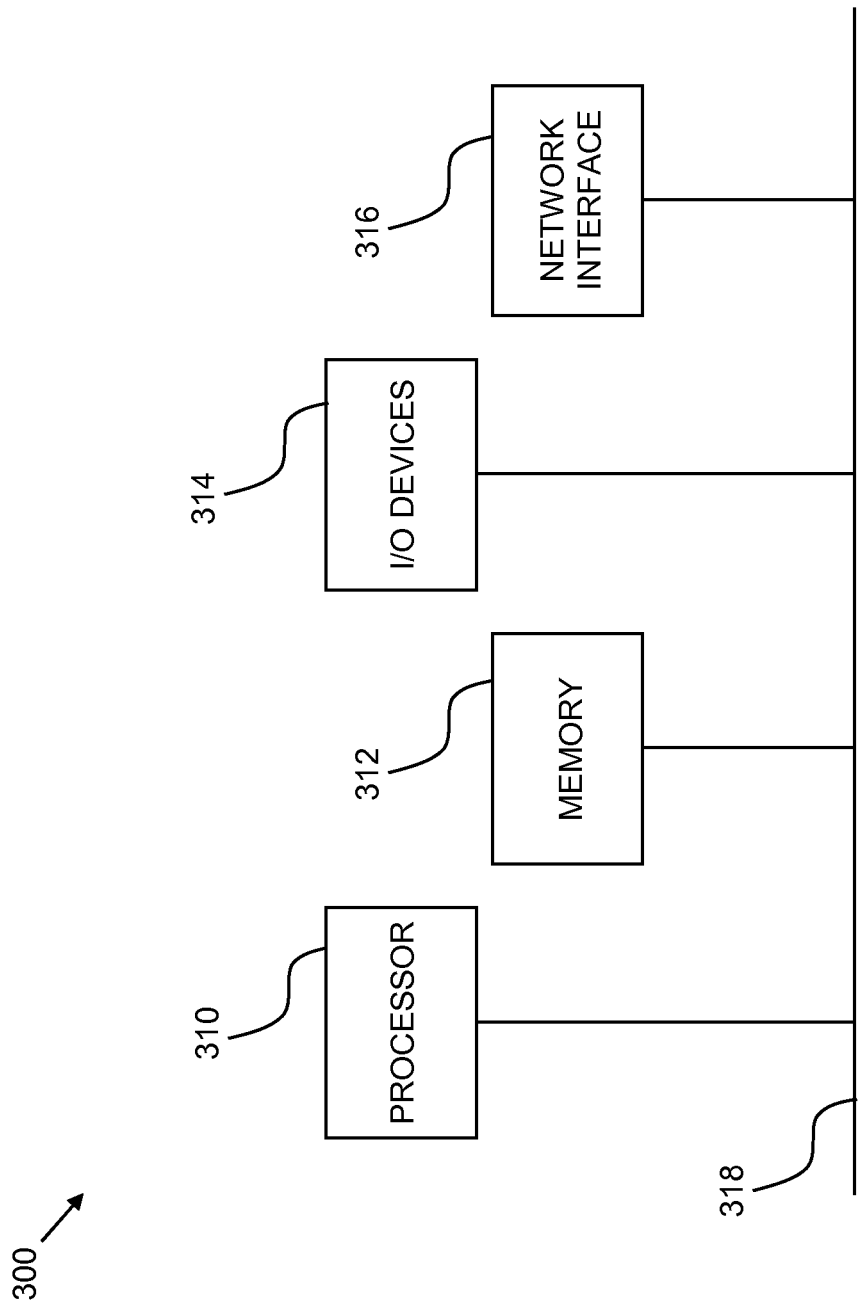

DETECTING PROXY-BASED COMMUNICATIONS

BACKGROUND

Fraudulent use of computer network-based financial applications, such as online banking applications, frequently involves a perpetrator performing a financial transaction via an intermediate computer, or "proxy," in order to obscure the true origin of fraudulent transaction.

SUMMARY

In one aspect of the invention a method is provided for evaluating communications via a computer network for the presence of proxy-based communications, the method including sending to a computer via a computer network a response to a first data request received from a requestor via the computer and the computer network, where the response includes a plurality of data packets followed by an out-of-sequence data packet that is out-of-sequence relative to any of the plurality of data packets, where the out-of-sequence data packet is configured to cause the computer, responsive to receipt of the out-of-sequence data packet by the computer after receipt of the plurality of data packets by the computer, to send an acknowledgement via the computer network, and where the out-of-sequence data packet is configured to cause the requestor, responsive to receipt of the out-of-sequence data packet by the requestor, and after receipt of the plurality of data packets by the requestor, to send a second data request via the computer and the computer network, detecting receipt of the acknowledgement at a first time, detecting receipt of the second data request at a second time, calculating a time delay between the first time and the second time, performing the sending, detecting and calculating steps a plurality of times, thereby calculating a plurality of time delays, and determining whether the requestor is communicating via a proxy by evaluating the plurality of time delays with respect to a predefined proxy evaluation criterion.

In other aspects of the invention systems and computer program products embodying the invention are provided.

BRIEF DESCRIPTION OF THE DRAWINGS

Aspects of the invention will be understood and appreciated more fully from the following detailed description taken in conjunction with the appended drawings in which:

FIG. 3 is a simplified block diagram illustration of an exemplary hardware implementation of a computing system, constructed and operative in accordance with an embodiment of the invention.

DETAILED DESCRIPTION

Figure 1:
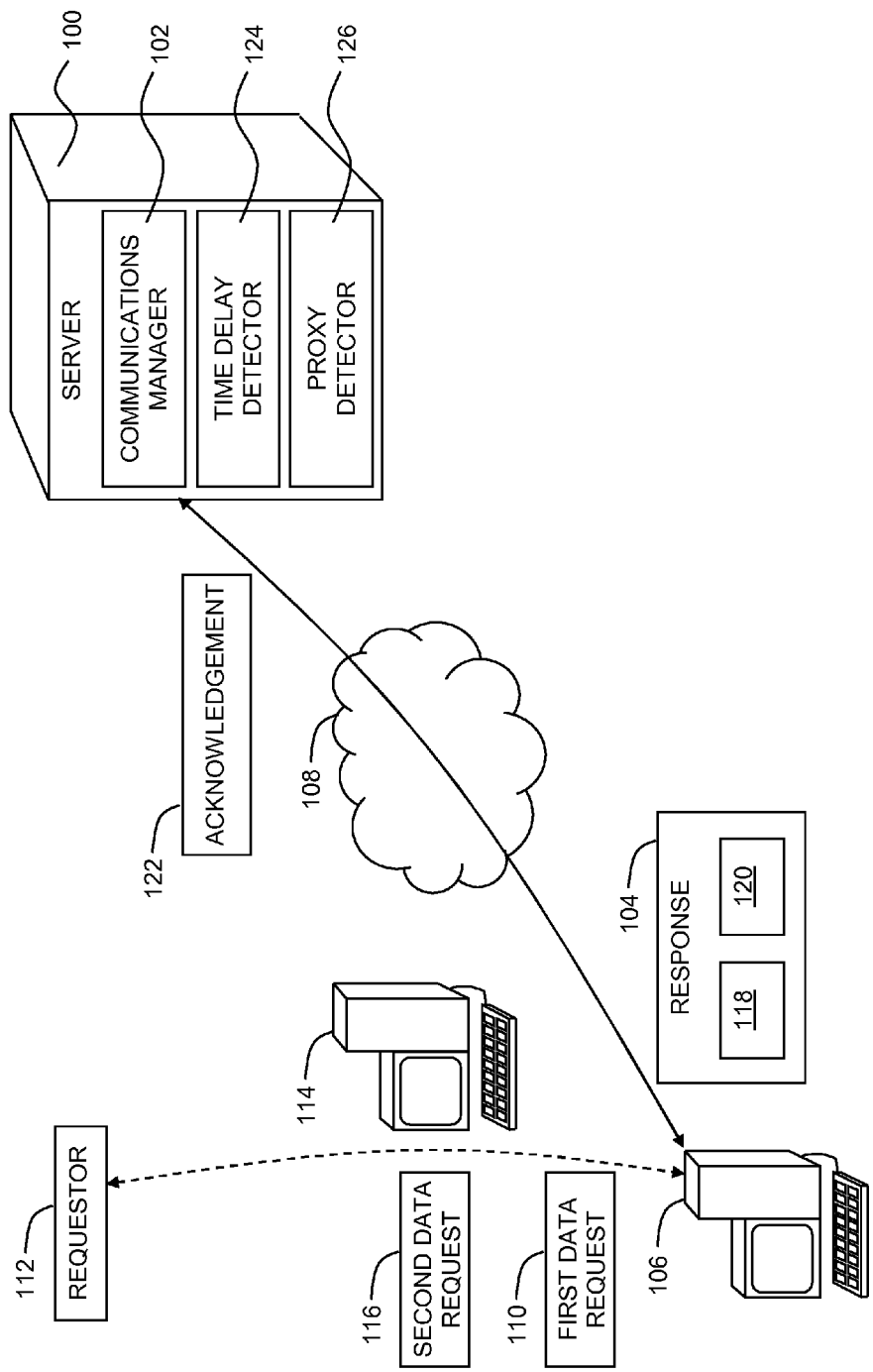
FIG. 1 is a simplified conceptual illustration of a system for detecting proxy-based communications via a computer network, constructed and operative in accordance with an embodiment of the invention.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1 which is a simplified conceptual illustration of a system for detecting proxy-based communications via a computer network, constructed and operative in accordance with an embodiment of the invention. In the system of FIG. 1, a computer, hereinafter referred to as server 100, is configured with a communications manager 102 which sends a response 104 to a computer 106 via a computer network 108, such as the Internet. Communications manager 102 may, for example, send response 104 to computer 106 in response to a first data request 110 sent by a requestor 112 to computer 100, such as where first data request 110 is a request to receive a web page from server 100 as part of a financial transaction, whereupon response 104 includes the web page. As it is not known if requestor 112 is co-located at computer 106, and is therefore communicating directly with server 100, or if requestor 112 is located at another computer, such as a computer 114, and is communicating with server 100 by using computer 106 as a proxy, communications between requestor 112 and computer 106 is shown in dashed lines. Requestor 112 as used herein may be understood to refer to computer software, such as a web browser, capable of performing the actions described herein with regard to requestor 112, such as may be controlled by a human operator or other computer software.

Response 104 includes, or is configured by communications manager 102 to include, a reference specifying a location of a resource on computer network 108, where the reference is configured to cause requestor 112 to send a second data request 116 to retrieve the resource from the location. For example, where first data request 110 is a request to receive a web page, the reference may be a Uniform Resource Locator (URL) within the web page that specifies the location of an image file stored at server 100, which image file requestor 112 may request in second data request 116.

Response 104 is sent by communications manager 102 in the form of multiple data packets, such as in accordance with the Transmission Control Protocol (TCP), where each packet indicates its sequence relative to the other data packets so as to enable their data to be reconstructed by recipients in accordance with a specified sequence. Prior to sending any, and preferably all, of the data packets of response 104 to computer 106, communications manager 102 preferably designates an out-of-sequence data packet 118 from among the data packets, where out-of-sequence data packet 118 is designated to be sent to computer 106 after one or more other data packets 120 from among the data packets are sent to computer 106. Communications manager 102 selects out-of-sequence data packet 118 for this designation such that:

out-of-sequence data packet 118 is out-of-sequence relative to the sequence of data packets 120, i.e., the sequence of out-of-sequence data packet 118 precedes the sequence of data packets 120;

out-of-sequence data packet 118 is configured to cause computer 106, responsive to receipt of out-of-sequence data packet 118 by computer 106 after receipt of data packets 120 by computer 106, to immediately send an acknowledgement 122 to server 100 via computer network 108, such as in accordance with the RFC 5681 protocol of the Internet Engineering Task Force; and out-of-sequence data packet 118 is configured to cause requestor 112, responsive to receipt of out-of-sequence data packet 118 by requestor 112, and after receipt of data packets 120 by requestor 112, to subsequently send second data request 116 to server 100 via computer 106 and computer network 108.

Preferably, communications manager 102 simply designates the first data packet in a given sequence of data packets as out-of-sequence data packet 118, with data packets 120 including the rest of the packets in the sequence, where out-of-sequence data packet 118 is to be sent to computer 106 only after data packets 120 are sent to computer 106. In accordance with the TCP protocol, this will cause computer 106 to immediately send an acknowledgement 122 to server 100 via computer network 108 indicating that all of the data packets in the sequence have been received. If, for example, the sequence of data in the data packets comprises web page data including a URL that specifies the location of an image file stored at server 100, and the entire sequence of data is required before requestor 112 can request the image file using the URL, then only after requestor 112 receives the entire data sequence, including the data from out-of-sequence data packet 118, will requestor 112 be able to send second data request 116 to request the image file using the URL. Alternatively, communications manager 102 may designate as out-of-sequence data packet 118 one of the data packets whose data includes some or all of the URL. In this manner, and in addition to sending out-of-sequence data packet 118 after data packets 120, only after requestor 112 receives the data from out-of-sequence data packet 118 will requestor 112 be able to send second data request 116 to request the image file using the URL.

After designating out-of-sequence data packet 118, communications manager 102 sends data packets 120 to computer 106. And only after communications manager 102 sends data packets 120 to computer 106 does communications manager 102 send out-of-sequence data packet 118 to computer 106.

Computer 106 is configured such that, in response to receiving out-of-sequence data packet 118 after data packets 120, computer 106 sends acknowledgement 122 to server 100 via computer network 108, such as acknowledging receipt of out-of-sequence data packet 118 and data packets 120, and typically does so immediately upon receiving out-of-sequence data packet 118 after data packets 120. Computer 106 is also configured to send data packets 120 and out-of-sequence data packet 118, to requestor 112, whereupon in response to receiving out-of-sequence data packet 118 and data packets 120, requestor 112 sends second data request 116 to server 100 via computer 106 and computer network 108, typically after computer 106 as sent acknowledgement 122 to server 100.

Communications manager 102 preferably performs multiple iterations of the operations described above, sending multiple sequences of data packets to computer 106 in response to multiple corresponding data requests from requestor 112, where in each iteration an out-of-sequence data packet is designated as such and sent out of sequence to requestor 112 as described above. For example, response 104 may include, or be configured by communications manager 102 to include, multiple references as described hereinabove, each specifying a location of a different resource on computer network 108, where each reference is configured to cause requestor 112 to send a separate data request 116 to retrieve the resource from the location. For example, the references may be URLs that specify the locations of various image files stored at server 100, which image files requestor 112 may request in separate data requests.

For each iteration of the operations described above, a time delay detector 124, with which server 100 may also be configured, detects, receipt of acknowledgement 122 at server 100 and records the time of its receipt, preferably to the nearest millisecond or smaller unit of time measurement;

detects receipt of second data request 116 at server 100 and records the time of its receipt as well; and calculates a time delay between the time when acknowledgement 122 was received and the time when second data request 116 was received.

Thus, time delay detector 124 preferably calculates multiple such time delays for multiple iterations of the operations described above.

Using the time delay information, a proxy detector 126, with which server 100 may also be configured, determines whether requestor 112 is communicating via a proxy by evaluating the time delay information with respect to a predefined proxy evaluation criterion. In one embodiment, proxy detector 126 determines a representative time delay from the plurality of time delays, such as by calculating an average time delay or a median time delay, and then determines that the representative time delay is consistent with a predefined time delay that is associated with proxy-based communications, such as where the representative time delay is greater than 20 milliseconds, representing an upper bound to the round-trip time between network hosts and their legitimate proxies, e.g., at the network gateway. In another embodiment, proxy detector 126:

determines an average delay time delay from the multiple time delays;

determines a variance of the average time delay relative to the multiple time delays;

determines an estimated distribution of the average time delay;

determines a probability that given the estimated distribution, a requestor-proxy round-trip time is greater than a predefined minimum requestor-proxy round-trip time, such as 10 milliseconds; and determines that requestor 112 is communicating via a proxy if the probability is greater than a predefined minimum value associated with proxy-based communications, such as 99%, or determines that requestor 112 is not communicating via a proxy if the probability is less than a predefined maximum value associated with non-proxy-based communications, such as 85%.

If proxy detector 126 is unable to determine whether or not requestor 112 is communicating via a proxy, additional iterations of the operations described above as performed by communications manager 102 and time delay detector are preferably performed.

If proxy detector 126 determines that requestor 112 is communicating via a proxy, server 100 preferably subjects any transactions involving requestor 112 to predefined security measures, such as subjecting such transactions to special scrutiny, curtailing such transactions, or preventing such transactions from being completed.

Thus, when requestor 112 communicates with server 100 via computer 106 as an intermediate proxy, computer 106 typically immediately sends acknowledgement 122 to server 100 in response to receiving out-of-sequence data packet 118 from server 100. As a proxy, computer 106 forwards response 104 to requestor 112, such as to computer 114, whereupon requestor 112 sends second data request 116 to server 100 via computer 106 as proxy, typically after computer 106 has sent acknowledgement 122 to server 100. Due to the additional communications overhead between server 100 and computer 106 as proxy, and between computer 106 as proxy and requestor 112, the time delay between when server 100 receives acknowledgement 122 and second data request 116 is typically greater than would otherwise be the case if proxy-based communications were not employed by requestor 112.

Figure 2:
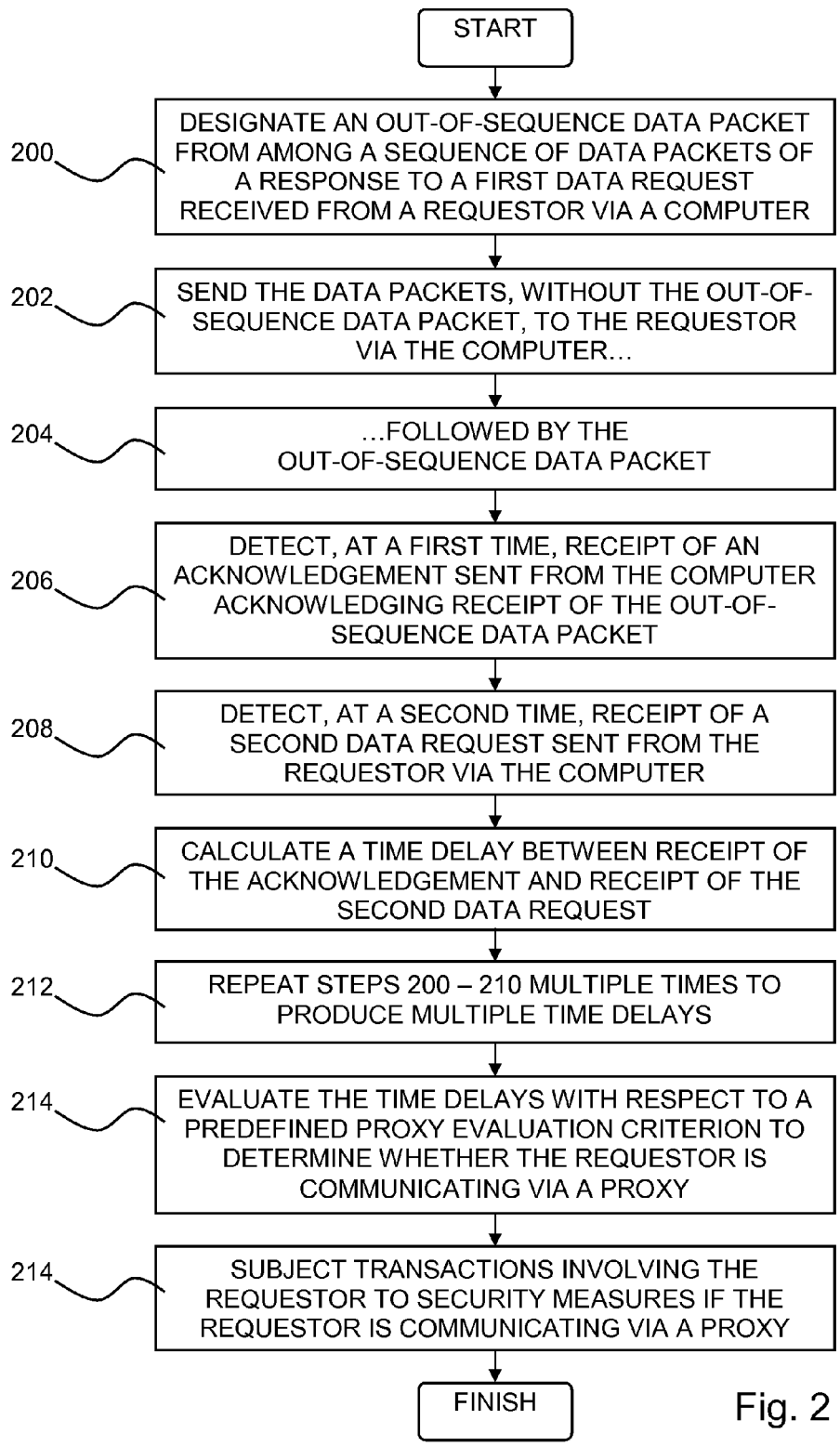
FIG. 2 is a simplified flowchart illustration of an exemplary method of operation of the system of FIG. 1, operative in accordance with an embodiment of the invention.

Reference is now made to FIG. 2 which is a simplified flowchart illustration of an exemplary method of operation of the system of FIG. 1, operative in accordance with an embodiment of the invention. In the method of FIG. 2, an out-of-sequence data packet is designated from among a sequence of data packets of a response to a first data request received from a requestor via a computer (step 200), where the out-of-sequence data packet is configured to cause a computer, responsive to receipt of the out-of-sequence data packet by the computer after receipt of the other data packets by the computer, to immediately send an acknowledgement, and cause the requestor, responsive to receipt of the out-of-sequence data packet by the requestor, and after receipt of other data packets by the requestor, to subsequently send a second data request. The data packets, without the out-of-sequence data packet, are sent to the requestor via the computer (step 202), followed by the out-of-sequence data packet (step 204). Receipt of an acknowledgement sent from the computer is detected at a first time, acknowledging receipt of the out-of-sequence data packet (step 206). Receipt of a second data request sent from the requestor via the computer is detected at a second time (step 208). A time delay is calculated between the time when the acknowledgement was received and the time when the second data request was received (step 210). Steps 200-210 are preferably performed multiple times to produce multiple time delays (step 212). The time delay information is evaluated with respect to a predefined proxy evaluation criterion to determine whether the requestor is communicating via a proxy (step 214). If proxy-based communications with the requestor is detected, transaction involving the requestor may be subjected to predefined security measures (step 216).

The system of FIG. 1 and method of FIG. 2 may be illustrated in the context of the following exemplary scenario in which:

a) a computer user as requestor 112, communicating via computer 106 as a proxy, uses web browser software at computer 114 to navigate to an online banking web site that is hosted by server 100 and initiates a financial transaction, during which transaction requestor 112 requests a web page from server 100, where the web page includes one or more URLs for resources that requestor will have to subsequently request;

b) communications manager 102 prepares response 104 as a sequence of data packets, which includes the web page, by designating one of the packets as out-of-sequence data packet 118 to be sent out of sequence to computer 106 relative to the other data packets 120;

c) communications manager 102 sends data packets 120 to computer 106, which forwards data packets 120 to requestor 112 at computer 114;

d) communications manager 102 sends out-of-sequence data packet 118 to computer 106;

e) computer 106 sends acknowledgement 122 to server 100 and out-of-sequence data packet 118 to requestor 112 at computer 114;

f) time delay detector 124 determines when acknowledgement 122 is received at server 100;

g) the web browser software at computer 114 sends second data request 116 to server 100 via computer 106 requesting one of the resources specified by a URL in the web page;

h) time delay detector 124 determines when second data request 116 is received at server 100;

i) time delay detector 124 calculates a time delay between the time when acknowledgement 122 was received at server 100 and the time when second data request 116 was received at server 100;

j) time delay detector 124 calculates multiple such time delays for multiple iterations of b)-i) above;

k) using the time delay information, proxy detector 126 determines that requestor is communicating via a proxy by evaluating the time delay information with respect to a predefined proxy evaluation criterion;

l) server 100 subjects the financial transaction involving requestor 112 to predefined security measures.

Referring now to FIG. 3, block diagram 300 illustrates an exemplary hardware implementation of a computing system in accordance with which one or more components/methodologies of the invention (e.g., components/methodologies described in the context of FIGS. 1-2) may be implemented, according to an embodiment of the invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for detecting proxy-based communications via a computer network, the system comprising:

a communications manager configured to, in each of a plurality of iterations, send to a computer via a computer network, a response to a first data request received from a requestor via the computer and the computer network, wherein the response includes a plurality of data packets followed by an out-of-sequence data packet that is out-of-sequence relative to any of the plurality of data packets, wherein the communications manager is configured to designate, prior to sending any of the data packets to the computer, the out-of-sequence data packet to be sent to the computer after the plurality of data packets are sent to the computer, wherein the out-of-sequence data packet is configured to cause the computer, responsive to receipt of the out-of-sequence data packet by the computer after receipt of the plurality of data packets by the computer, to send an acknowledgement via the computer network, and wherein the out-of-sequence data packet is configured to cause the requestor, responsive to receipt of the out-of-sequence data packet by the requestor, and after receipt of the plurality of data packets by the requestor, to send a second data request via the computer and the computer network; and a proxy detector configured to,
   for each of the plurality of iterations,
      detect receipt of the acknowledgement at a first time,
      detect receipt of the second data request at a second time, and
      calculate a time delay between the first time and the second time,
   thereby calculating a plurality of time delays, and
   determine whether the requestor is communicating via a proxy by evaluating the plurality of time delays with respect to a predefined proxy evaluation criterion,
wherein the communications manager and the proxy detector are implemented in any of
   a) computer hardware, and
   b) computer software embodied in a non-transitory, computer-readable storage medium.

2. The system according to claim 1 wherein the response includes a reference specifying a location of a resource on the computer network.

3. The system according to claim 2 wherein the reference is configured to cause the requestor to send the second data request to retrieve the resource from the location.

4. The system according to claim 1 wherein the plurality of data packets are configured to cause the requestor to send the second data request only after receipt of the out-of-sequence data packet by the requestor.

5. The system according to claim 1 wherein the proxy detector is configured to
   determine a representative time delay from the plurality of time delays, and
   determine that the representative time delay is consistent with a predefined time delay that is associated with proxy-based communications.

6. The system according to claim 1 wherein the proxy detector is configured to
   determine an average delay time delay from the plurality of time delays,
   determine a variance of the average time delay relative to the plurality of time delays,
   determine an estimated distribution of the average time delay,
   determine a probability that given the estimated distribution, a requestor-proxy round-trip time is greater than a predefined minimum requestor-proxy round-trip time, and
   determine that the requestor is communicating via a proxy if the probability is greater than a predefined minimum value associated with proxy-based communications.

7. The system according to claim 1 wherein the proxy detector is configured to
   determine an average delay time delay from the plurality of time delays,
   determine a variance of the average time delay relative to the plurality of time delays,
   determine an estimated distribution of the average time delay,
   determine a probability that given the estimated distribution, a requestor-proxy round-trip time is greater than a predefined minimum requestor-proxy round-trip time, and
   determine that the requestor is not communicating via a proxy if the probability is less than a predefined maximum value associated with non-proxy-based communications.

8. The system according to claim 1 and further comprising subjecting an activity involving the requestor to a security measure responsive to determining that the requestor is communicating via a proxy.

9. A computer program product for detecting proxy-based communications via a computer network, the computer program product comprising:
   a non-transitory, computer-readable storage medium; and
   computer-readable program code embodied in the storage medium, wherein the computer-readable program code is configured to
   a) send to a computer via a computer network, a response to a first data request received from a requestor via the computer and the computer network, wherein the response includes a plurality of data packets followed by an out-of-sequence data packet that is out-of-sequence relative to any of the plurality of data packets,
      1) wherein the computer-readable program code is configured to designate, prior to sending any of the data packets to the computer, the out-of-sequence data packet to be sent to the computer after the plurality of data packets are sent to the computer,
      2) wherein the out-of-sequence data packet is configured to cause the computer, responsive to receipt of the out-of-sequence data packet by the computer after receipt of the plurality of data packets by the computer, to send an acknowledgement via the computer network, and
      3) wherein the out-of-sequence data packet is configured to cause the requestor, responsive to receipt of the out-of-sequence data packet by the requestor, and after receipt of the plurality of data packets by the requestor, to send a second data request via the computer and the computer network, and
   b) for each of the plurality of iterations,
      1) detect receipt of the acknowledgement at a first time,
      2) detect receipt of the second data request at a second time, and
      3) calculate a time delay between the first time and the second time,
   thereby calculating a plurality of time delays, and
   c) determine whether the requestor is communicating via a proxy by evaluating the plurality of time delays with respect to a predefined proxy evaluation criterion.

10. The computer program product according to claim 9 wherein the plurality of data packets are configured to cause the requestor to send the second data request only after receipt of the out-of-sequence data packet by the requestor.

* * * * *